United States Patent
Taber

(10) Patent No.: US 10,176,249 B2
(45) Date of Patent: Jan. 8, 2019

(54) SYSTEM FOR IMAGE INTELLIGENCE EXPLOITATION AND CREATION

(71) Applicant: Raytheon Company, Waltham, MA (US)

(72) Inventor: James E. Taber, Garland, TX (US)

(73) Assignee: Raytheon Company, Waltham, MA (US)

( * ) Notice: Subject to any disclaimer, the term of this patent is extended or adjusted under 35 U.S.C. 154(b) by 767 days.

(21) Appl. No.: 14/501,703

(22) Filed: Sep. 30, 2014

(65) Prior Publication Data

US 2016/0092582 A1   Mar. 31, 2016

(51) Int. Cl.
 *G06F 17/30*  (2006.01)
(52) U.S. Cl.
 CPC ...... *G06F 17/3066* (2013.01); *G06F 17/3087* (2013.01); *G06F 17/30265* (2013.01); *G06F 17/30654* (2013.01)
(58) Field of Classification Search
 CPC .......... G06F 17/3066; G06F 17/30265; G06F 17/30654; G06F 17/3087; G06F 17/30672; G06F 17/30669
 See application file for complete search history.

(56) References Cited

U.S. PATENT DOCUMENTS

| | | | | |
|---|---|---|---|---|
| 4,328,542 A * | 5/1982 | Anastas | ............... | G06F 21/6218 711/148 |
| 4,962,532 A * | 10/1990 | Kasiraj | ................ | G06Q 10/107 713/166 |
| 8,041,730 B1 * | 10/2011 | Upstill | .............. | G06F 17/30241 707/706 |
| 8,682,925 B1 * | 3/2014 | Marquardt | ........ | G06F 17/30477 707/722 |
| 9,342,503 B1 * | 5/2016 | Evans | ................... | G06F 9/4448 |
| 2006/0230334 A1 * | 10/2006 | Slawson | ........... | G06F 17/30058 715/202 |
| 2007/0198495 A1 * | 8/2007 | Buron | ................. | G06F 17/3087 |

(Continued)

OTHER PUBLICATIONS

Beijing Baidue Netcom Science & Technology: "What's in this picture, ai becomes as smart as a toddler", http://www.bloomberg.com/news/articles/2015-05-22/what-s-in-this-picture-ai-becomes-as-smart-as-a-toddler, [retrieved Jul. 31, 2015].

*Primary Examiner* — Robert W Beausoliel, Jr
*Assistant Examiner* — Arthur Ganger
(74) *Attorney, Agent, or Firm* — Burns & Levinson, LLP; Joseph M. Maraia

(57) ABSTRACT

A system, and corresponding method, for retrieving image and metadata from multiple sources in response to a query received from an originator having a corresponding clearance level. The query is received through an interface and then any errors or ambiguities in the received query are determined and corrected to create a parsed query. A standardized query is created from the parsed query and has a system usable format including corresponding query processing limitations and the standardized query is stored for later processing. The standardized query comprises one or more terms not accessible to the originator. The stored standardized query is processed to collect resulting corresponding image and metadata information. The query results are presented to the originator if a corresponding clearance level of the query results is at or below the clearance level of the originator.

22 Claims, 10 Drawing Sheets

(56) References Cited

U.S. PATENT DOCUMENTS

| | | | |
|---|---|---|---|
| 2007/0250493 A1* | 10/2007 | Peoples | G06F 17/30669 704/2 |
| 2008/0162471 A1* | 7/2008 | Bernard | G06F 17/30017 |
| 2009/0144560 A1* | 6/2009 | Takenaka | G06F 17/30265 713/189 |
| 2010/0010968 A1* | 1/2010 | Redlich | G06F 17/30672 707/E17.014 |
| 2011/0153515 A1* | 6/2011 | Pitzo | G06F 17/30312 705/342 |
| 2012/0023399 A1* | 1/2012 | Hoshino | G06F 17/2735 715/256 |
| 2012/0078914 A1* | 3/2012 | Roeder | G06F 17/30619 707/741 |
| 2012/0177304 A1* | 7/2012 | Taber | G06F 17/30265 382/284 |
| 2013/0144901 A1* | 6/2013 | Ho | G06F 17/30554 707/769 |
| 2013/0275164 A1* | 10/2013 | Gruber | G10L 17/22 705/5 |
| 2013/0325841 A1* | 12/2013 | Ahmed | G06F 17/30448 707/713 |
| 2014/0075004 A1* | 3/2014 | Van Dusen | H04L 41/04 709/223 |
| 2014/0337338 A1* | 11/2014 | Shinn | G06F 17/30312 707/737 |
| 2014/0358923 A1* | 12/2014 | Nunez | G06F 17/30707 707/737 |
| 2015/0149499 A1* | 5/2015 | Mauge' | G06F 17/30672 707/766 |
| 2016/0335459 A1* | 11/2016 | Kling | G06F 21/74 |
| 2017/0161360 A1* | 6/2017 | Barsukova | G06F 17/30654 |
| 2017/0199928 A1* | 7/2017 | Zhao | G06F 17/30654 |

* cited by examiner

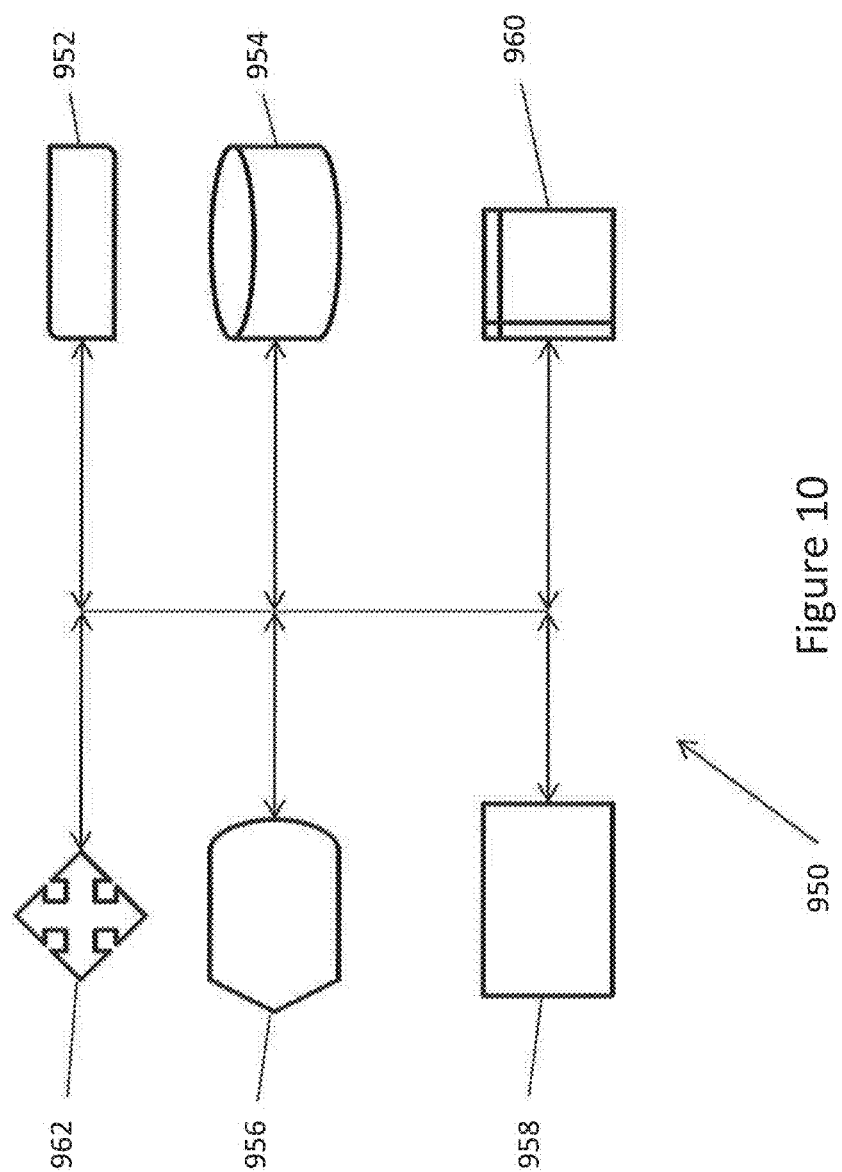

SYSTEM FOR IMAGE INTELLIGENCE EXPLOITATION AND CREATION

FIELD OF THE INVENTION

The present invention generally relates to systems for exploiting collected image data and metadata, and in particular to such systems which access any variety of sources of such data.

BACKGROUND OF THE INVENTION

Wide ranging sources of image and metadata can be useful resources of current geographic, demographic and situational information. Accessing sources of such variety can be very inefficient. Combining information from such varied sources can be even more inefficient and challenging.

In view of the above discussion, it would be beneficial to have a search engine that can receive a very wide variety of user generated queries, translate them into adequate system formats which enable data retrieval from resources of great diversity and then combine the diverse retrieved information into a readily usable format.

SUMMARY OF THE INVENTION

One embodiment of the present invention provides a method for retrieving image and metadata from multiple sources, comprising the steps of: receiving queries through an interface; parsing received queries to determine errors and ambiguities; standardizing parsed queries into predetermined system usable formats including query limitations; storing standardized queries; processing stored queries to collect queried image and metadata information within query limitations until each query is complete; and processing completed queries for delivery.

The step of receiving may include providing a user interface including security access, user account and query feedback functions. The step of parsing may include verifying clarity of location identity information and metadata descriptions in queries. The step of parsing may include translating human generated queries into acceptable system formats. The step of standardizing may include converting queries into standard formats and adding rules for effective searching of each query. The step of processing stored queries may select one or more sources of query information for fulfilling each query and send the standardized queries to the selected one or more sources. The step of processing stored queries may store retrieved query information until each query is completed. The step of processing completed queries for delivery may include formatting the retrieved query information and combining image and metadata as desired. The step of processing completed queries for delivery may include transmitting formatted query information in user selectable formats and via user selectable delivery modes. The method may further comprise controlling the steps of receiving. standardizing, processing stored queries and processing completed queries for security purposes.

Another embodiment of the present invention provides a system for retrieving image and metadata from multiple sources, comprising: a processor coupled to receive queries from one or more operators and/or from other systems; and a memory, the memory including code representing instructions that when executed cause the processor to: receive queries through an interface; parse received queries to determine errors and ambiguities; standardize parsed queries into predetermined system usable formats including query limitations; storing standardized queries; process stored queries to collect queried image and metadata information within query limitations until each query is complete; and process completed queries for delivery.

The memory may include code representing instructions which when executed cause the processor to provide a user interface including security access, user account and query feedback functions. The memory may include code representing instructions which when executed cause the processor to parse queries by verifying clarity of location identity information and metadata descriptions in queries. The memory may include code representing instructions which when executed cause the processor to parse queries by translating human generated queries into acceptable system formats. The memory may include code representing instructions which when executed cause the processor to standardize queries by converting queries into standard formats and adding rules for effective searching of each query. The memory may include code representing instructions which when executed cause the processor to process stored queries by selecting one or more sources of query information for fulfilling each query and sending the standardized queries to the selected one or more sources. The memory may include code representing instructions which when executed cause the processor to process stored queries while storing retrieved query information until each query is completed. The memory may include code representing instructions which when executed cause the processor to process completed queries by formatting retrieved information and combining image and metadata as desired. The memory may include code representing instructions which when executed cause the processor to process formatted query information for delivery in user selectable formats and via user selectable delivery modes. The memory may include code representing instructions which when executed cause the processor to control the processes of: receiving queries, standardizing parsed queries, processing stored queries and processing completed queries, for security purposes.

BRIEF DESCRIPTION OF THE DRAWINGS

The present invention is illustratively shown and described in reference to the accompanying drawings, in which:

FIG. 10 is a block diagram of a computing device suitable for use as image intelligence exploitation system of FIG. 2.

DETAILED DESCRIPTION OF THE DRAWINGS

The present invention is introduced using examples and particular embodiments for descriptive purposes. Although a variety of examples are presented to show how various configurations can be employed to achieve the desired improvements, these particular embodiments are only illustrative and not intended in any way to restrict the inventions presented.

Figure 1:
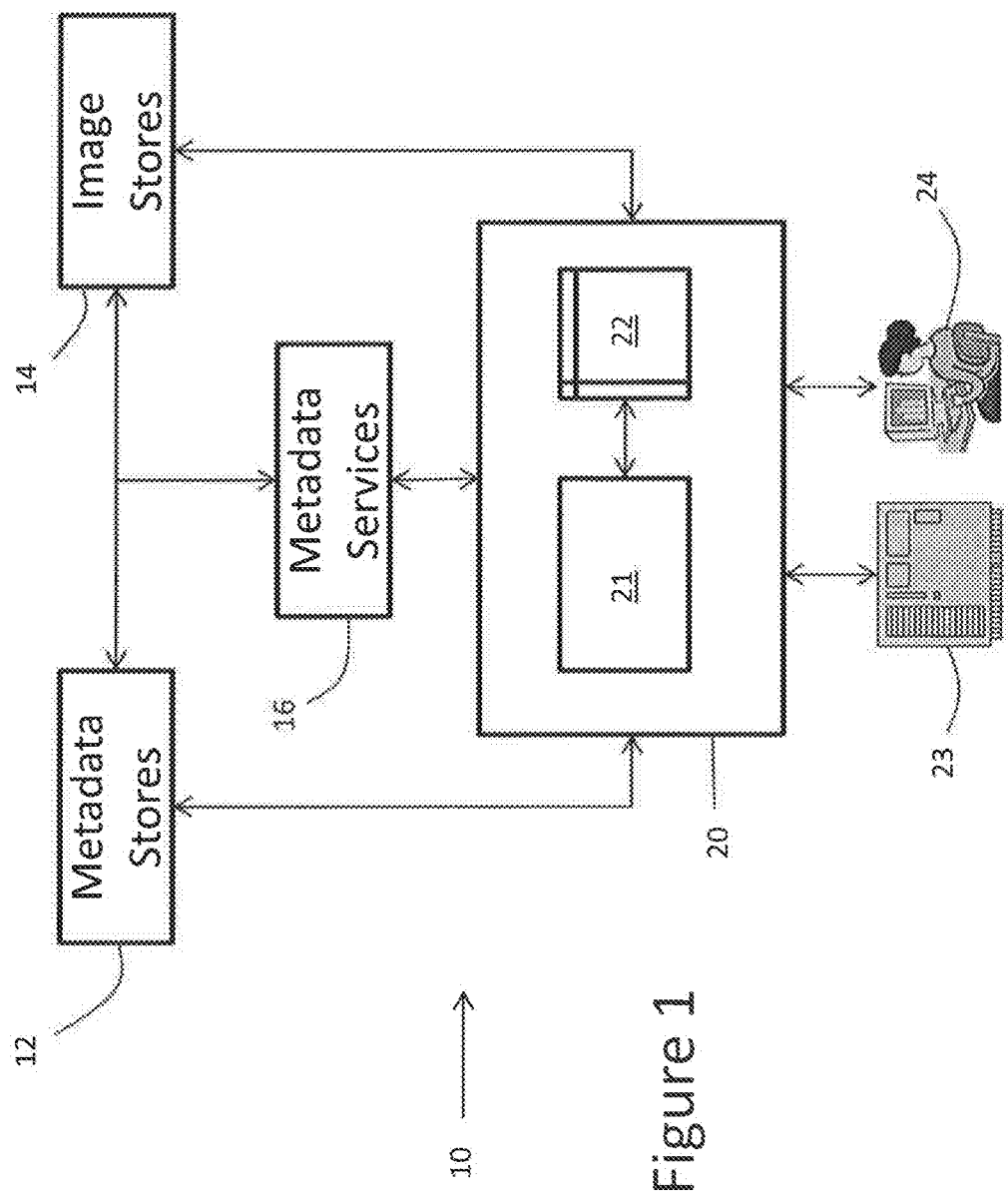
FIG. 1 is a general block diagram of an intelligence data system showing interconnection with an image intelligence exploitation system constructed in accordance with the present invention.

FIG. 1 shows an image intelligence system 10 generally including metadata stores 12, image stores 14 and a metadata services system 16. Further shown is an image intelligence exploitation system 20 embodying the present invention and including one or more processors 21 and memory 22. System 20 is accessible by one or more operators 24 and/or other systems 23.

Figure 2:
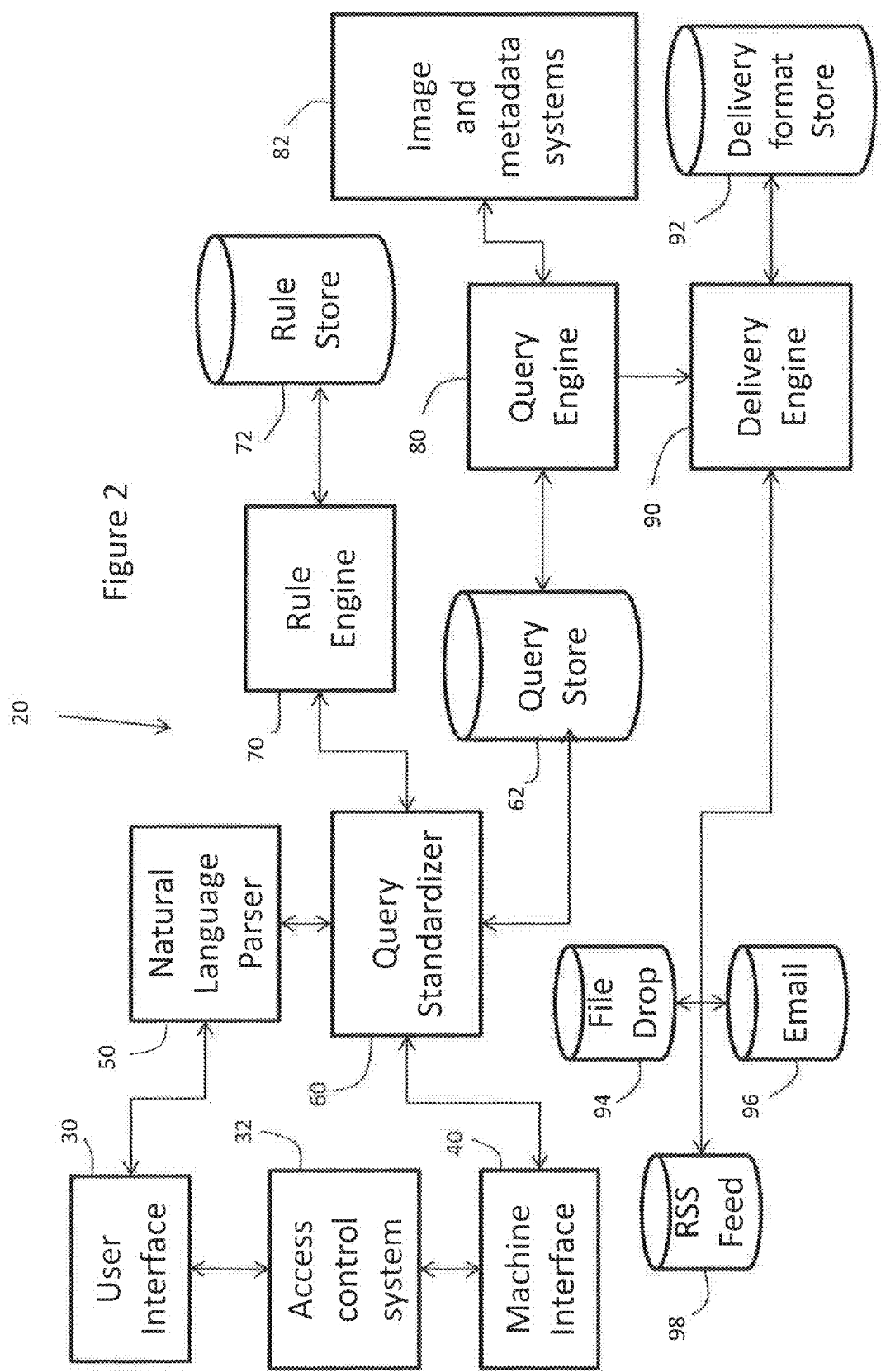
FIG. 2 is a block diagram of an image intelligence exploitation system constructed in accordance with the present invention.

FIG. 2 is a more detailed block diagram of the image intelligence exploitation system 20. System 20 includes various processes embodied in processors 21 and memory 22, including a user interface 30 coupled through an access control system 32 to a machine interface 40. A natural language parser 50 processes queries from user interface 30, and along with machine interface 40, accesses a query standardizer 60. Query standardizer 60 accesses a rule engine 70, and its associated rule store 72 for processing queries for query store 62. A query engine 80 processes queries from query store 62, accessing image and metadata system 82, and their associated metadata stores 12 and image stores 14 of FIG. 1. Completed query data or information is coupled to delivery engine 90 for formatting with reference to delivery format store 92, and the results are sent to one of more of a file drop 94, email server 96 or an RSS feed 98, as determined by the query originator.

Most communication paths in FIG. 2 are bi-directional by design so that status information during all phases of query prosecution is available. Such status information can include, but is not limited to: that a query is too ambiguous; that a query has insufficient information to prosecute; that contradictory rules have been generated by rule engine 70; that an RSS feed is not available; or simply that processing is continuing.

In further detail, an operator 24, or a remote system 23, logs in via user interface 30 going through access control system 32 which typically requires multi-part authentication of user credentials against a security access service. Successful login provides connection through machine interface 40. Received queries typically include some requirement for information regarding a geo-spatial area, i.e. "Status of air-defense systems around X", where X could be a geo-spatial location, a proper name, an accepted indexing system, or a common name. Geo-spatial location may be designated in any suitable system, such as MGRS, decimal degrees, degrees, minutes, seconds, UTM, etc. . . .

The query is passed to a natural language parser (NLP) 50 which attempts to translate the human readable query into a machine parseable query. NLP 50 may include significant computing resources. Any ambiguity or other issues concerning submitted queries are handled by a back-and-forth interaction via the user interface 30. Ambiguities may include any identifiable issue in the query, such as an unidentifiable location, an ambiguous location or an ambiguous information request. Queries may also be machine or system 23 generated from other sources. Machine generated queries are likely to easily pass NLP 50, whereas human generated queries are likely to undergo greater processing before being passed to query standardizer 60.

Query standardizer 60 translates submitted queries into standard formats, which allows a human or a machine to submit a query without having any knowledge of the internal system format. This allows sensitive query fields to be hidden from outside view. During standardizing, rule engine 70 is interrogated to determine how much information will be required to satisfy the query. The standard limits may be provided either by the human operator or a connecting machine/service. Such limits might require a 100% cloud-free image or require signals to be in various configurations. Once the query is normalized for search terms and completion requirements the query is stored in query store 62.

Query store 62 can be a relational database, an NOSQL database, a flatfile, or an in-memory map store. Query engine 80 will continually poll the query store 62 for new, modified, or incomplete queries. Query engine 80 will take each query it finds and start a process in order to fulfill the query. The process will select metadata service(s) or direct connections to retrieve data which satisfies the query requirements. The process takes the returned data, or a reference to the location of the data, and stores it with the stored query until the query is complete. In this manner, query engine 80 can work through multiple queries in query store 62 while waiting for all requested information to be returned.

Once there is sufficient information to fulfill the query, the information is passed to delivery engine 90 which formats the data as requested by the user in the query with reference to delivery format store 92. Once the final product is created, it is sent to the requester via the delivery mode requested in the query, i.e. file drop 94, email 96 or RSS feed 98.

Figure 3:
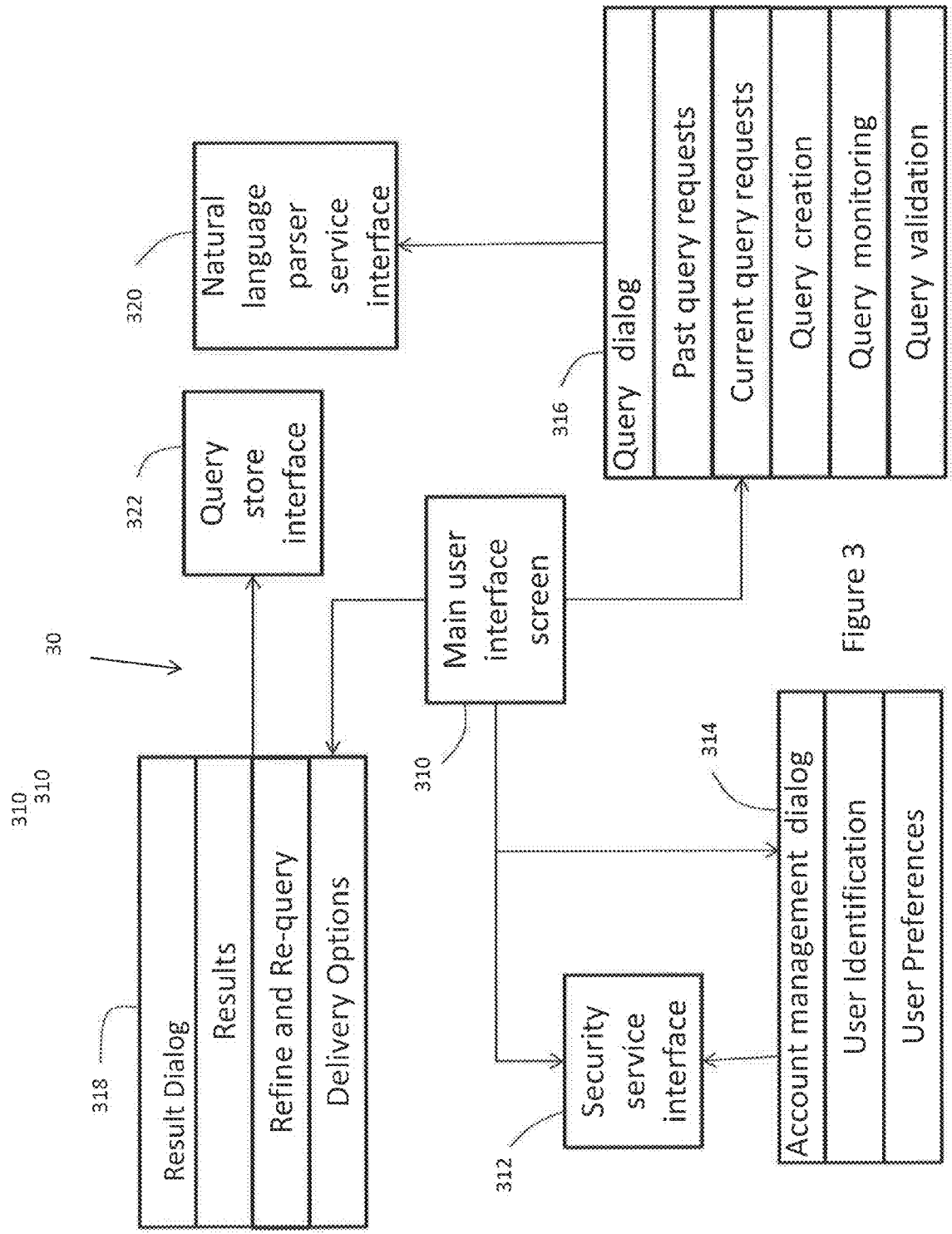
FIG. 3 is a block diagram of a user interface subsystem used in conjunction with the embodiment of FIG. 2.

User interface 30 of FIG. 3 provides a point-of-presence for the underlying query service. It allows users to securely access the system, modify their account details, create a query, respond to system feedback and view the progress and results of a query. It also allows queries which result in sub-optimal outcomes to be modified and resubmitted.

The user interface 30 is comprised of a main user interface screen 310, a security service interface 312, an account management dialog 314, a query dialog 316 for developing queries, a result dialog 318, natural language parser service interface 320 and a query store interface 322.

The main user interface screen 310, through which the user logs on, controls the creation of the query, reviews the results of the query, and manages user accounts. The various dialogs and interfaces in user interface 30 communicate through screen 310, which can also provide access to various reporting mechanisms for query results.

Security service interface 312 acts as a gateway to a security application which provides access control and user management. Account management dialog 314 can handle user identification and preferences and can allow modification of user information such as email, user name, password, and the like. Query dialog 316 provides means for creating information requests, review of past and currently pending queries, monitoring of query progress and query validation. Results dialog 318 provides for reviewing the status of a request and modifying or resubmitting a request. A natural language parser service interface 320 acts as a gateway to a language parser service. Query store interface 322 that acts as a gateway to the query store 62 (FIG. 2).

Figure 4:
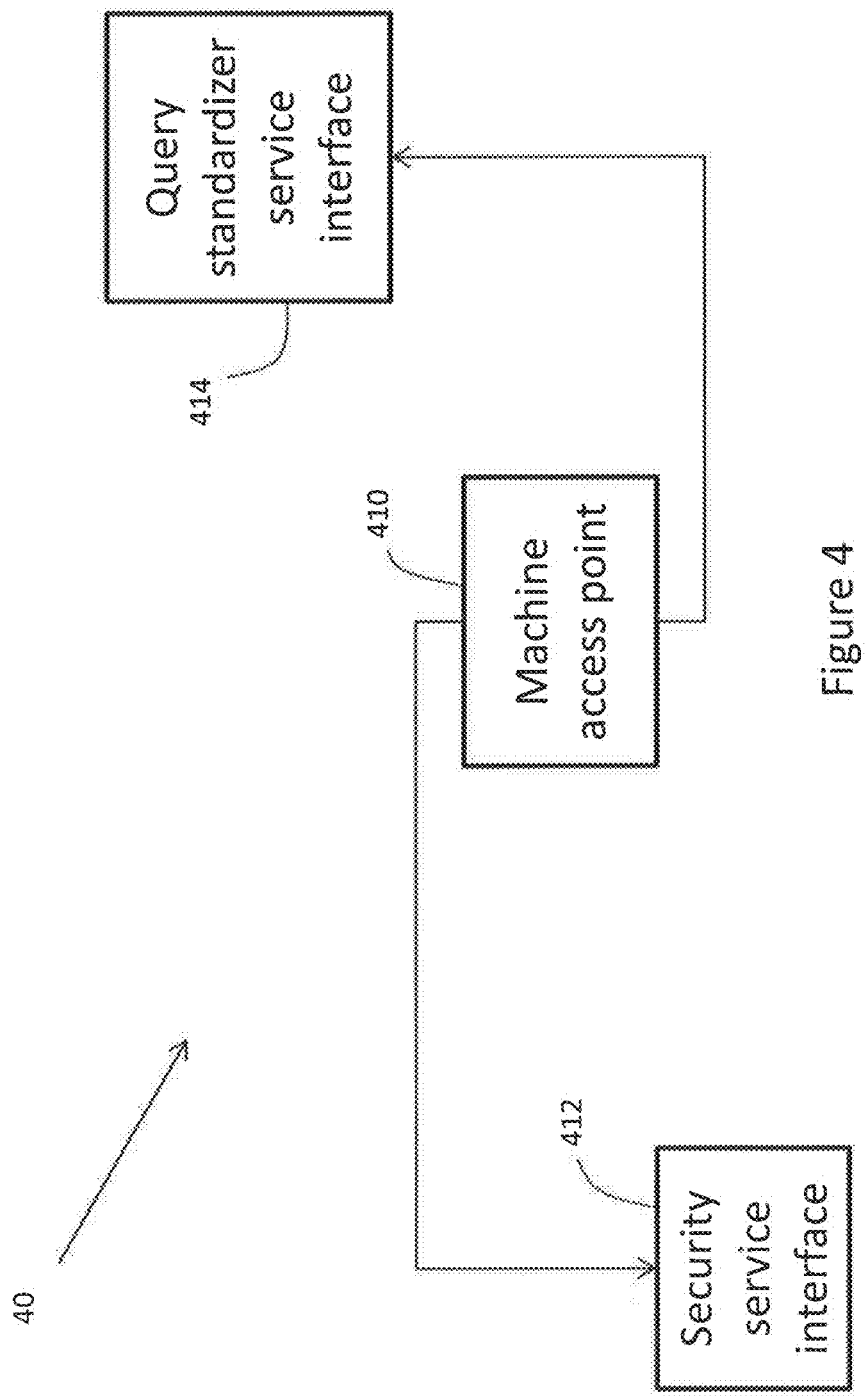
FIG. 4 is a block diagram of a machine interface subsystem used in conjunction with the embodiment of FIG. 2.

Machine interface 40 (FIG. 4) provides a point-of-presence to securely accept query requests which are submitted by other systems, services, or machines. Machine interface 40 comprises a machine access point 410 which other machines connect to in order to execute a query, a security service interface 412 which acts as a gateway to a security application providing access control, and a query normalizer interface 414 which acts as a gateway to language parser 50.

Figure 5:
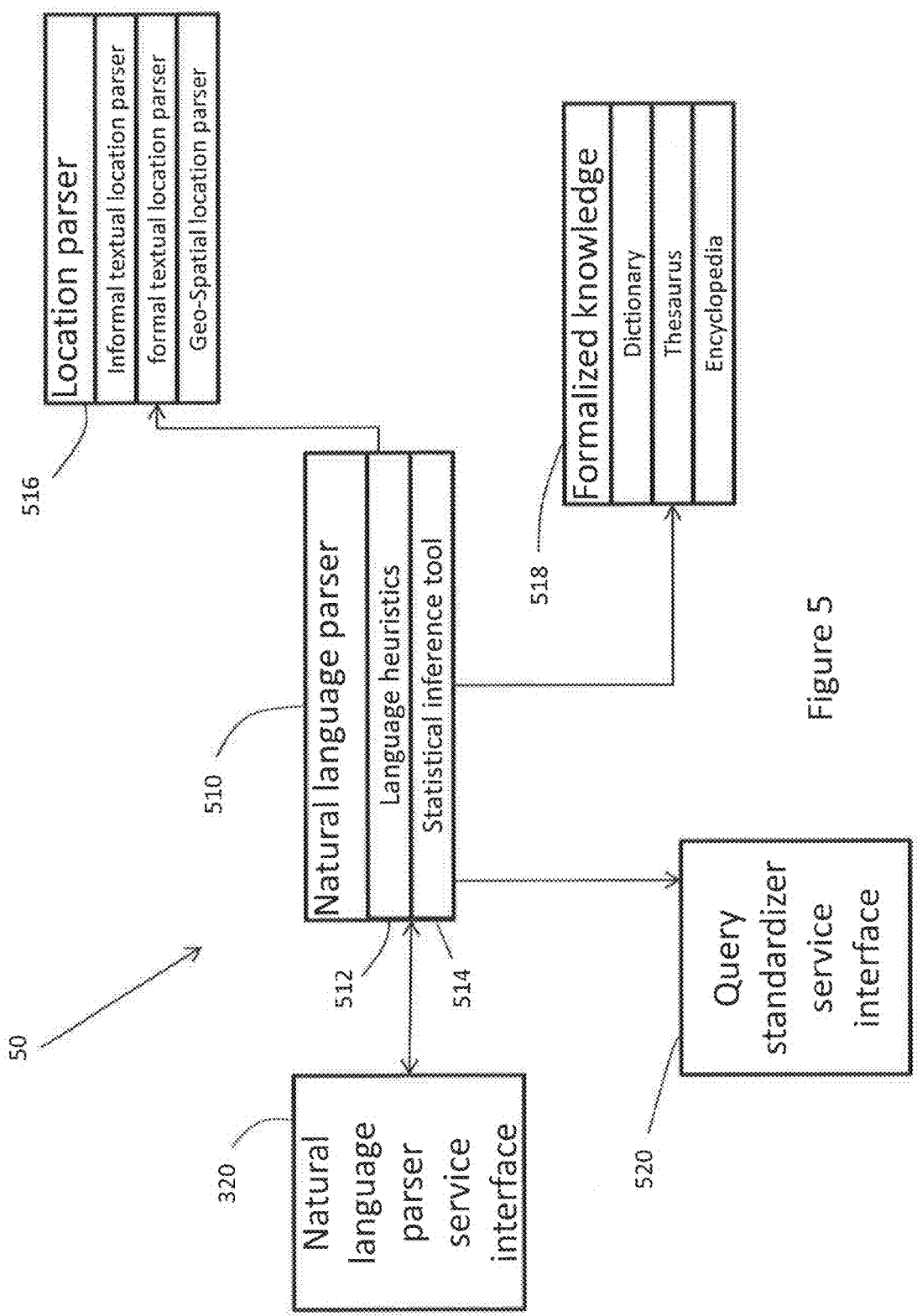
FIG. 5 is a block diagram of a natural language parser subsystem used in conjunction with the embodiment of FIG. 2.

Natural language parser (NLP) 50 (FIG. 5) provides the capability to confidently provide a high-fidelity machine parseable equivalent of a natural human query. NLP 50 comprises a natural language parser service interface 320. This is the connection point which the user interface transfers to, and receives from the natural language component, information regarding the query, the queries completeness, and the queries level of ambiguity.

Figure 6:
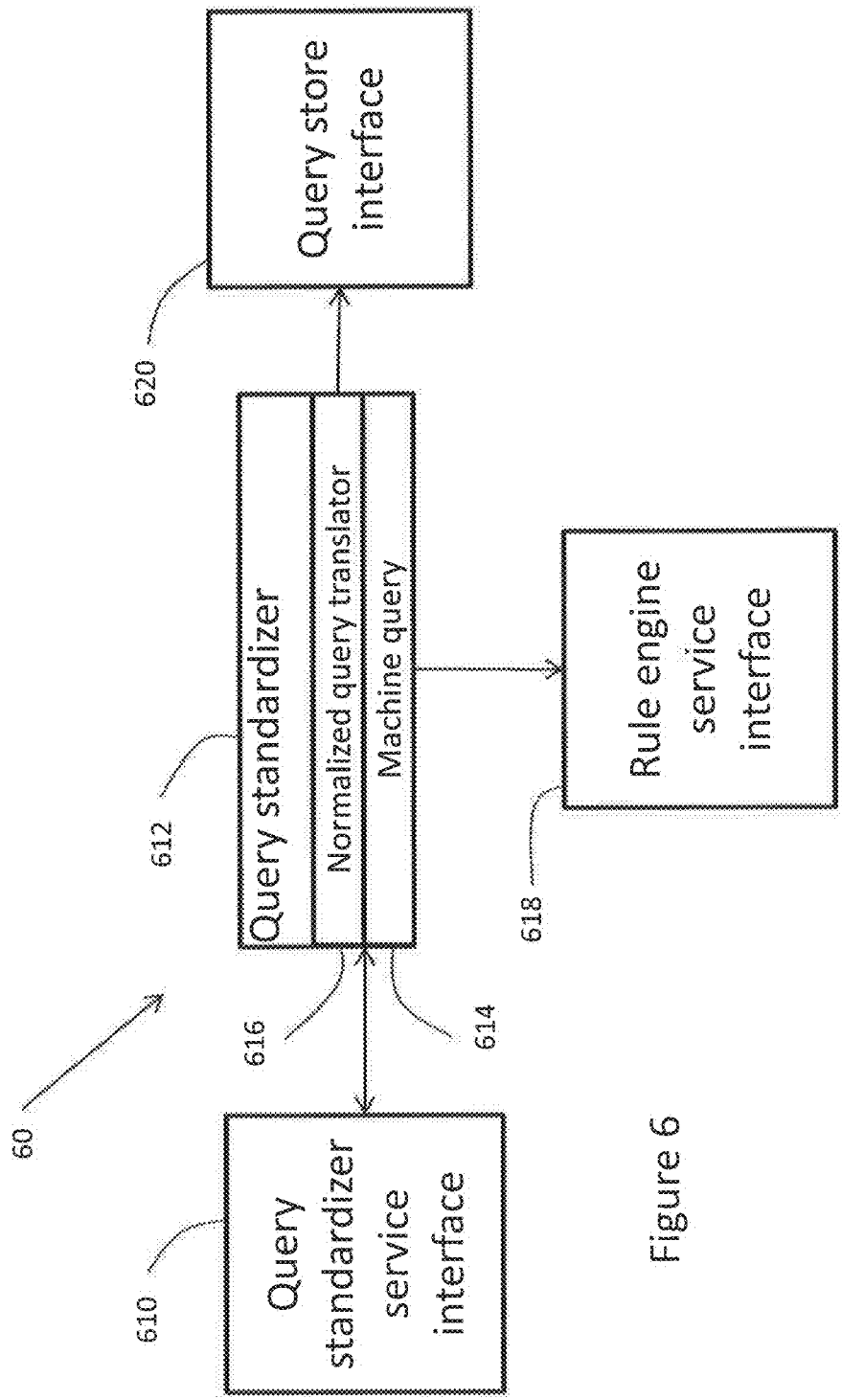
FIG. 6 is a block diagram of a query standardizer subsystem used in conjunction with the embodiment of FIG. 2.

A natural language parser 50, which is responsible for parsing a query and determining completeness and ambiguity comprises a core component 510 including language heuristics component 512 to determine meaning and a statistical inference tool 514 to determine completeness. NLP 50 uses specialized knowledge tools to generate further meaning such as a geo-location parser 516 which can take formal or informal location information and de-compose it down to a geo-location point or series of points. Dictionaries, thesauruses, and encyclopedias 518 are used to de-conflict the meaning of words. A query standardizer service interface 520 provides access to the query standardizer 60 (FIGS. 2 and 6).

The query standardizer 60 provides the capability to reduce a normalized query into its final machine form. The use of this secondary component isolates the internal specifics of the system from outside interfaces. This isolation allows for use by systems with a lower security level by hiding classified terms and other sensitive information from the higher level interfaces. It also provides the rule set for determining final completeness. Query standardizer 60 comprises a query standardizer service interface 610 through which the natural language parser 50 and machine interface 40 transfers queries to the query standardizer 60.

A core component 612 of a query standardizer 60 is responsible for deconstructing a normalized or machine query and creating a system standard query, and comprises a translator 614 for machine queries which converts queries into a standardized query format, and a translator 616 for normalized human queries. A rule engine service interface 618 provides access to the rule engine 70 (FIG. 2). A query store interface 620 provides access to the query store 62.

Figure 7:
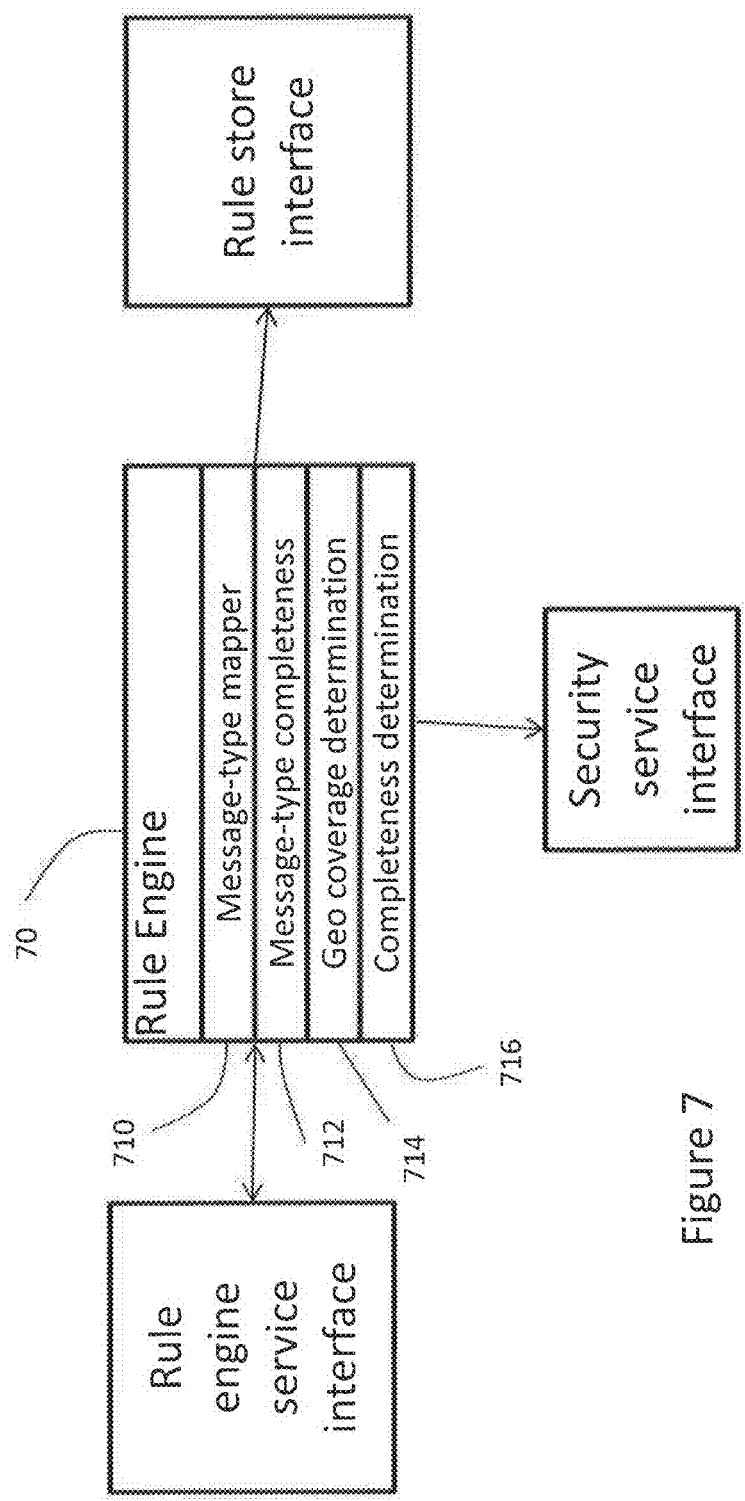
FIG. 7 is a block diagram of a rule engine subsystem used in conjunction with the embodiment of FIG. 2.

The rule engine 70 (FIG. 7) provides the capability to attach rules for how to complete the query to a final machine form query. Rules cover what types of messages satisfy a portion or portions of a query and what combination of messages and what number of messages provide what percentage of query completeness. It also interfaces with the security service to determine if any portion of an answer to any query would result in a product being at a higher classification than the requestor's classification.

The query standardizer 70 comprises a message-type mapper 710 which determines what message types will contain information and what portions of those messages contain information that will satisfy the query in-part or in-whole. Mapper 710 interfaces with the security service to determine accessibility to those message types and message type portions.

Message completeness component 712 determines what combination of messages will provide sufficient completeness for the query or a portion of the query. Geo coverage determination 714 determines what kind of imagery and what quality of imagery will provide sufficient completeness for the query or a portion of the query. It also provides rules for time of day and cloud coverage completeness. Lastly, it interfaces with the security service to determine accessibility to those image types and geo-coverage. Completeness determination component 716 provides an overall rule set for when the query is satisfied to the level set by the requestor.

Figure 8:
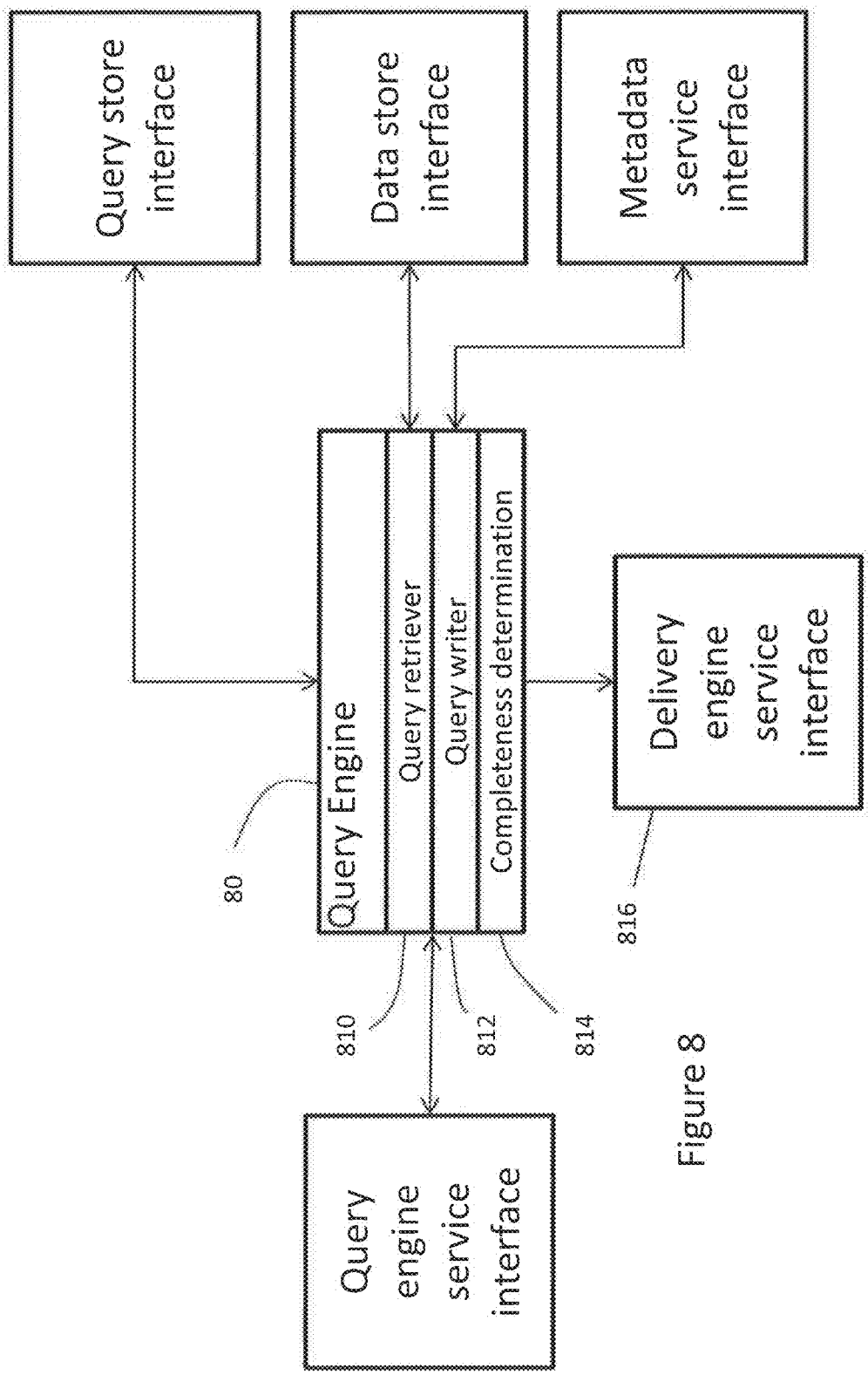
FIG. 8 is a block diagram of a query engine subsystem used in conjunction with the embodiment of FIG. 2.

Query engine 80 (FIG. 8) provides the capability to send queries to the metadata service or directly attached stores. It is responsible for periodically retrieving a query from the query store, executing associated queries, aggregating the results, attaching results to the query, determining completeness of query, writing the updated query to the query store, and upon reaching the completeness threshold passing the completed query to the delivery engine for dissemination.

Query engine 80 includes query retriever 810 which periodically retrieves queries from the query store 62 for additional processing. The frequency of retrieval for processing is based on what message types are being interrogated from what store and upon the update frequency of that message type in that store. Query writer 812 receives the results of a query, parses out the portions of the response that are relevant to the query, updating the query with the information, setting a last updated time for the query and message types, and returning the query back to the query store. Completeness determination 814 adjudicates whether an overall rule set for the query or a portion of the query is satisfied. It marks the portions of the query that are satisfied as such so that further processing does not occur if not required. Once a query is either fully answered or has exceeded any time limit, it is passed to the delivery engine service interface 816.

Figure 9:
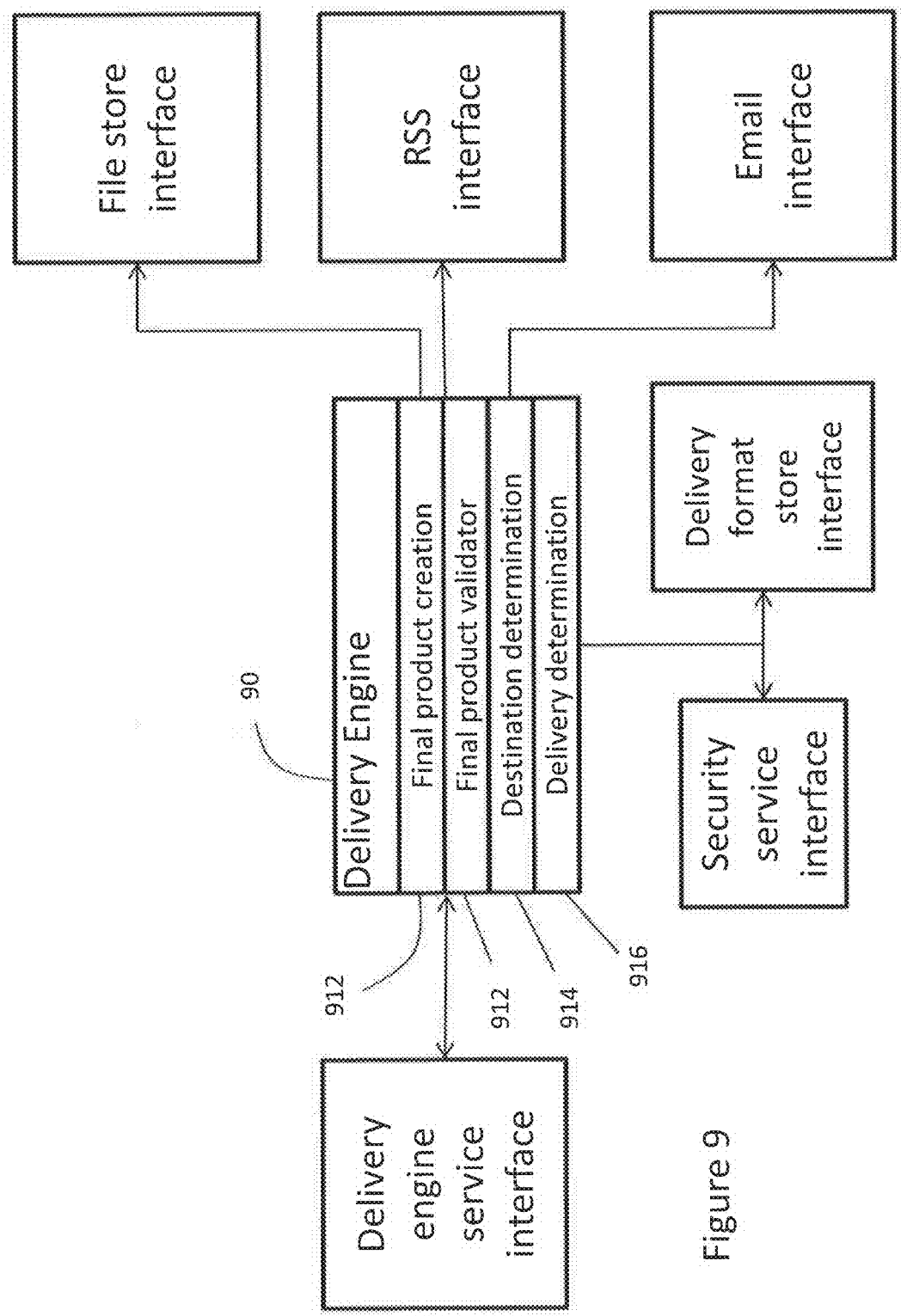
FIG. 9 is a block diagram of a delivery engine subsystem used in conjunction with the embodiment of FIG. 2.

The delivery engine 90 (FIG. 9) provides the capability to format a finalized query into its delivery format such as zip file, formatted pdf, or any other available presentation format. The delivery engine 90 will make a final determination of completeness. Prior to delivery it will verify that the final product does not exceed the security level of either the requestor or the delivery end-point.

Delivery engine 90 includes a final product creation component 910 which identifies what the final format of the product should be, interfaces with the delivery format store to retrieve any required templates, and moves data from the completed query into the template to complete the final product.

Also included is a final product validator 912 which makes a final review of completeness of the final product. It interfaces with the security service for a final releasability determination. Destination determination 914 identifies how a final product is to be delivered and interfaces with the security service to ensure the destination point does not violate a security rule. Delivery determination 916 ensures that the final product was delivered to the destination point and whether or not the final product has been retrieved.

The query store 62, rule store 72, and delivery format store 92 components are comprised of one or more data store capabilities or applications and their associated service interfaces. They can be relational databases, NOSQL databases, flat files, in-memory stores, or any other compatible volatile or non-volatile storage mechanism.

Images used may be still images, motion imagery (imagery collected at less than 30 fps), full-motion video (imagery collected at greater than 30 fps), or computed products. Images may be merged or composite images of one or more type above or reductions thereof. Imagery may come from a variety of conventional and unconventional sources, such as airborne image collectors (U-2), spaceborne image collectors (Geo-Eye), traffic cameras, web-enabled cameras, conversion of RADAR/LIDAR Data into n-dimensional point clouds, 3-dimensional imagery generated by merging 2-dimensional imagery or emerging imaging technology. Image stores may store raw imagery and imagery metadata together or may utilize separate raw and metadata stores. Images may be in any format (NITF2.1, NITF2.0, JPEG, JPEG-2000, PNG, MPEG-2, MPEG-4, n-Dimensional Point Cloud). Image stores may be dedicated to a single platform of single image type or serve multiple image collection platforms and store a variety of image types. Image stores may be local to the invention or remote. Image stores may be flat file systems, relational databases, NOSQL databases, or in memory stores. The invention may access image stores via a metadata service or directly.

Data may be available via one or more normalized data stores which may be accessible individually or as a cluster or by direct access to raw data. Data can be served via relational database, NOSQL database, flat file, in-memory store or any other storage mechanism that references data either at-rest or in-motion. Normalized data may arrive at the normalized metadata store on a continuous, asynchronous basis via a 2-step process controlled by the metadata service. Metadata Stores can be local or remote. Generally metadata represents a collection of HUMINT, GEOINT, MASINT, OSINT, SIGINT, TECHINT, CYBINT, or FININT. Metadata can be information concerning social media, imagery collected by airborne platforms, video collected by traffic cameras, measurements from vibration sensors. The list of possible metadata is as extensive as the number of different sensors. Metadata may be replicated across different stores purposefully or not. Metadata store access can be predefined or added during run-time or reconfigured during run-time. The metadata access service has local knowledge of available stores including: security protocols, data delivery protocols, and special access instructions. The metadata normalization service has knowledge of how local and remote data is stored and how that information should be transformed to map to a normalized set. Normalized data is a subset of all data containing entries such as time, location, and original source. Applications frequently ask first for normalized data and if it is of interest, request the full data. Advantages of using collected and normalized data are single point of maintenance and removal of duplicate data. Raw data can be accessed directly from similar stores in a similar way. One advantage of using dedicated connections to raw stores is segregation of data.

FIG. 10 is a block diagram of a computing device 950 suitable for use as image intelligence exploitation system 20 of FIG. 2. The computing device 950 includes one or more input devices 952, one or more output devices 954, one or more display devices 956, one or more processor(s) 958, memory 960, and a communication module 962. The modules and devices described herein can, for example, utilize the processor 958 to execute computer executable instructions and/or the modules and devices described herein can, for example, include their own processor to execute computer executable instructions. It should be understood the computing device 950 can include, for example, other modules, devices, and/or processors known in the art and/or varieties of the described modules, devices, and/or processors.

The communication module 962 includes circuitry and code corresponding to computer instructions that enable the computing device to send/receive signals to/from the network resources of FIG. 1, including metadata stores 12, image stores 14 and metadata services 16. For example, the communication module 962 provides commands from the processor 958 to fulfill queries from query store 62. The communication module 962 also, for example, network responses to executed queries.

The input devices 952 receive information from a user (not shown) and/or another computing system (not shown). The input devices 952 can include, for example, a keyboard, a scanner, a microphone, a stylus, a touch sensitive pad or display. The output devices 954 output information generated by system 950 (e.g., information to a data storage device, information to a printer, information to a speaker, information to a display, for example, graphical representations of information). The processor 958 executes the operating system and/or any other computer executable instructions for the computing device 950, e.g., executes all of the functional aspects of system 20. The memory 960 stores a variety of information/data, for all aspects of the process of system 20. The memory 960 can include, for example, long-term storage, such as a hard drive, a tape storage device, or flash memory; short-term storage, such as a random access memory, or a graphics memory; and/or any other type of computer readable storage.

The above-described systems and methods can be implemented in digital electronic circuitry or in computer hardware executing firmware or software. The implementation can be as a computer program product that is tangibly embodied in a non-transitory memory device. The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors, or one or more servers that include one or more processors, that execute a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program in the apparatus, the processor, the special circuitry and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data. Magnetic disks, magneto-optical disks, or optical disks are examples of such storage devices.

Data transmission and instructions can occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

The image data exploitation system 20 is connected to one or more networks and/or one or more file systems with one or more data stores. Data stores may be added or removed during runtime without affecting the functionality of the application. The system 20 is configured to connect to some or all of the data stores. System configuration may be modified during runtime without affecting the functionality of the application.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A method of retrieving image and metadata from multiple sources, in response to a query from an originator having a corresponding classification level, the method implemented in a system comprising a hardware processor coupled to a non-transitory memory including code executed by the processor to execute the method comprising the steps of:
    receiving the query from the originator through an interface;
    creating a parsed query from the received query by determining and correcting any errors and ambiguities in the received query;
    creating a standardized query from the parsed query, the standardized query having a predetermined system usable format including corresponding query processing limitations wherein one or more query terms in the standardized query are hidden from the originator;
    storing the standardized query for subsequent processing;
    processing the stored standardized query against the multiple sources and retrieving image and metadata information within the query processing limitations until complete; and
    delivering the retrieved image and metadata information to the query originator,
    wherein the one or more hidden query terms comprise terms or other information that are at a classification level that is higher than the classification level of the originator.

2. The method of claim 1, wherein the step of receiving the query includes providing a user interface including security access, user account and query feedback functions.

3. The method of claim 1, wherein the step of creating the parsed query includes verifying clarity of location identity information and metadata descriptions in the received query.

4. The method of claim 1, wherein the step of creating the parsed query includes translating a human generated query into a predetermined system usable format.

5. The method of claim 1, wherein the step of creating the standardized query includes converting the parsed query into a standard format and adding rules for effective searching of the multiple sources for the standardized query.

6. The method of claim 1, wherein the step of processing the stored standardized query comprises selecting one or more sources of query information for fulfilling the standardized query and sending the standardized query to the selected one or more sources.

7. The method of claim 6, wherein the step of processing the stored standardized query comprises storing retrieved query information until the query is completed.

8. The method of claim 1, wherein the step of processing the completed query for delivery includes formatting the retrieved query information and combining image and metadata.

9. The method of claim 8, wherein the step of processing the completed query for delivery includes transmitting formatted query information in user selectable formats and via user selectable delivery modes.

10. The method of claim 1, further comprising controlling the steps of receiving, standardizing, processing stored queries and processing completed queries for security purposes.

11. The method of claim 1, wherein the step of delivering the retrieved image and metadata information further comprises:
    determining an information classification level corresponding to the retrieved image and metadata information; and
    delivering the retrieved image and metadata information only if the information classification level is not higher than the originator classification level.

12. A system for retrieving image and metadata from multiple sources in response to a query received, from an originator having a corresponding classification level, at an interface, comprising:
    a hardware processor coupled to the interface; and
    a non-transitory memory, coupled to the processor, the memory including code representing instructions that when executed cause the processor to:
    receive the query through the interface;
    create a parsed query from the received query by determining and correcting errors and ambiguities in the received query;
    create a standardized query from the parsed query, the standardized query having a predetermined system usable format including corresponding query processing limitations wherein one or more query terms in the standardized query are hidden from the originator;
    store the standardized query for subsequent processing;
    process the stored standardized query against the multiple sources and retrieve image and metadata information within the query limitations; and
    deliver the retrieved image and metadata information to the query originator,
    wherein the one or more hidden query terms comprise terms or other information that are at a classification level that is higher than the classification level of the originator.

13. The system of claim 12, wherein the memory includes code representing instructions which when executed cause the processor to provide a user interface including security access, user account and query feedback functions.

14. The system of claim 12, wherein the memory includes code representing instructions which when executed cause the processor to create the parsed query by verifying clarity of location identity information and metadata descriptions in the received query.

15. The system of claim 12, wherein the memory includes code representing instructions which when executed cause the processor to create the parsed query by translating a human generated query into a predetermined system usable format.

16. The system of claim 12, wherein the memory includes code representing instructions which when executed cause the processor to create the standardized query by converting the parsed query into a standard format and adding rules for effective searching of the multiple sources for the standardized query.

17. The system of claim 12, wherein the memory includes code representing instructions which when executed cause the processor to process the stored standardized query by selecting one or more sources of query information for fulfilling the standardized query and sending the standardized query to the selected one or more sources.

18. The system of claim 17, wherein the memory includes code representing instructions which when executed cause the processor to store retrieved query information until the processing of the stored standardized query is completed.

19. The system of claim 12, wherein the memory includes code representing instructions which when executed cause the processor to process the completed query for delivery by formatting the retrieved query information and combining image and metadata.

20. The system of claim 19, wherein the memory includes code representing instructions which when executed cause the processor to process formatted query information for delivery in user selectable formats and via user selectable delivery modes.

21. The system of claim 12, wherein the memory includes code representing instructions which when executed cause the processor to control the processes of: receiving queries, standardizing parsed queries, processing stored queries and processing completed queries, for security purposes.

22. The system of claim 12, wherein the memory further comprises code representing instructions which when executed cause the processor to:
   determine an information classification level corresponding to the retrieved image and metadata information; and
   deliver the retrieved image and metadata information only if the information classification level is not higher than the originator classification level.

\* \* \* \* \*